Oct. 14, 1952  R. P. HARSHBERGER  2,613,582
GARDEN TRACTOR WITH VIBRATORY TOOL
Filed Feb. 21, 1947  4 Sheets-Sheet 1
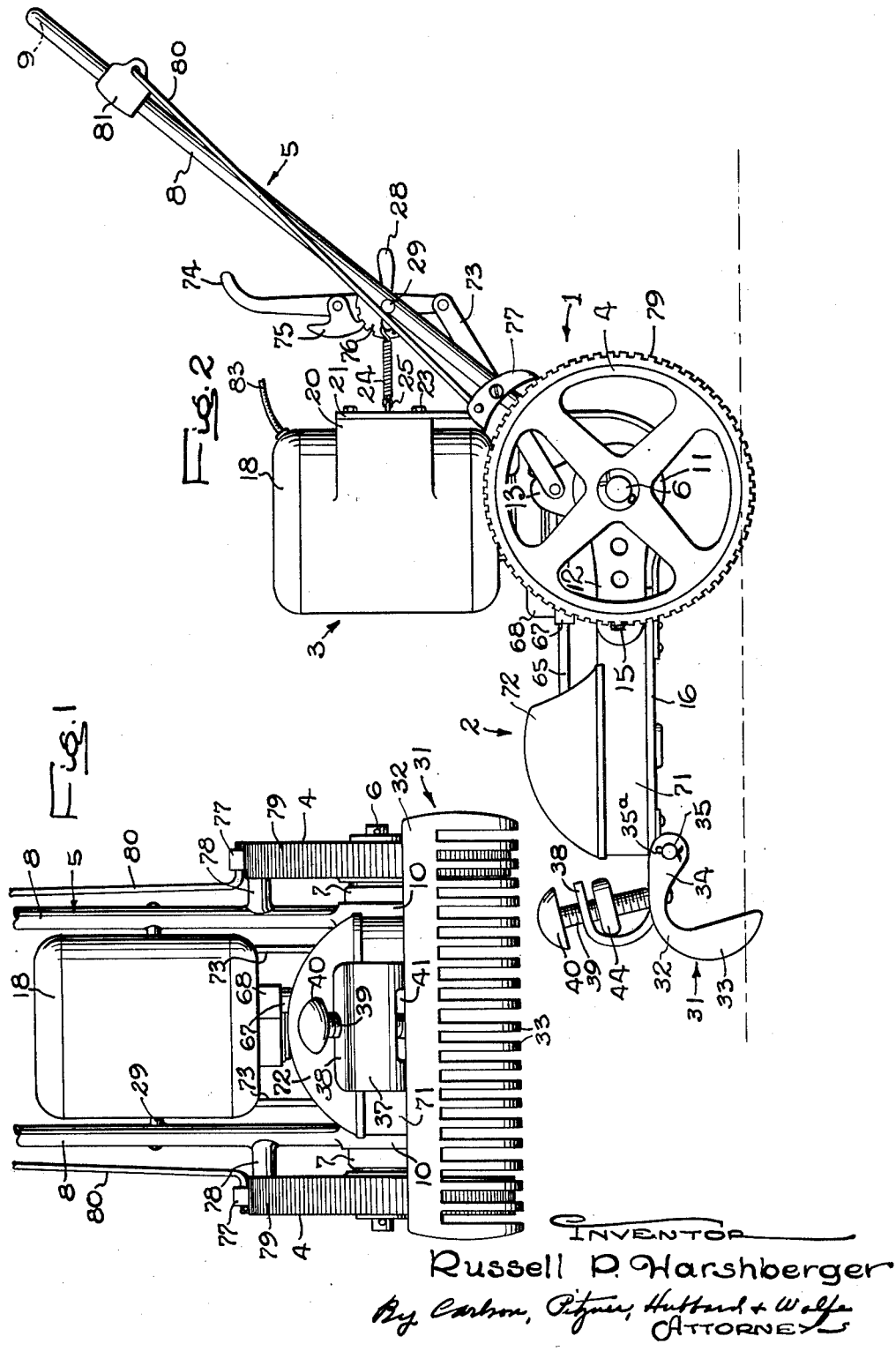
INVENTOR
Russell P. Harshberger
By Carlson, Pitzner, Hubbard + Wolfe
ATTORNEYS

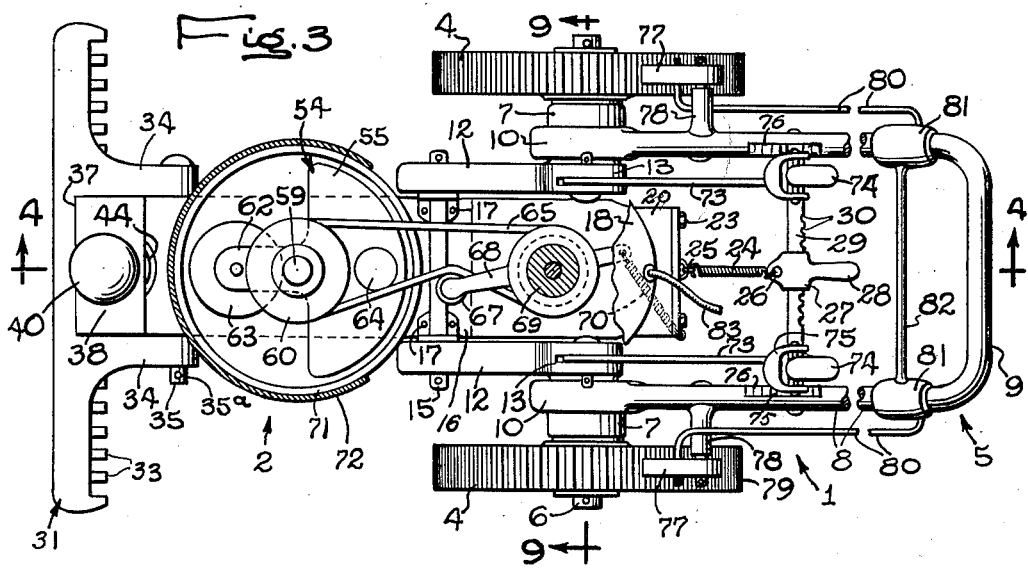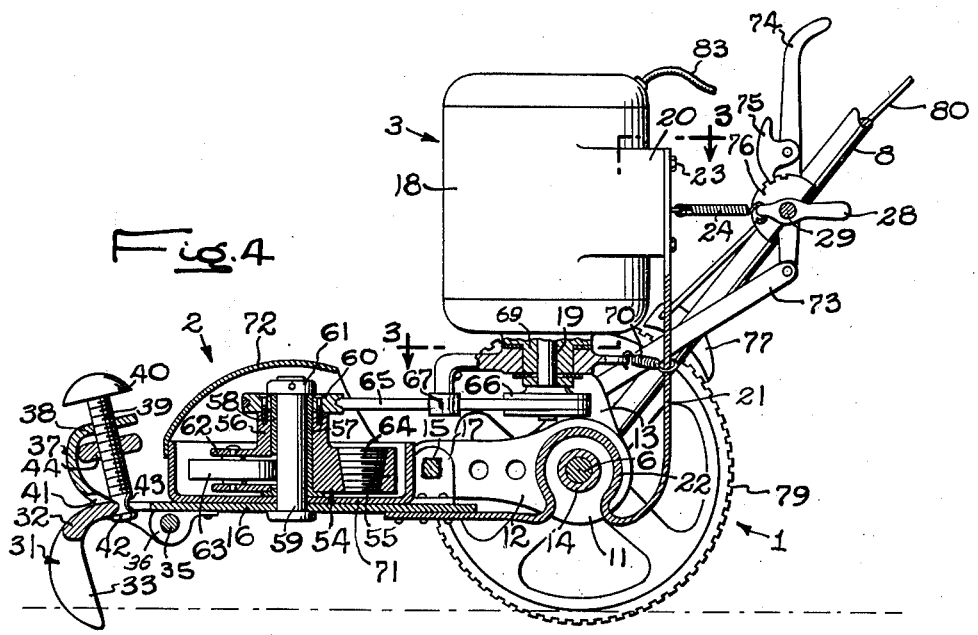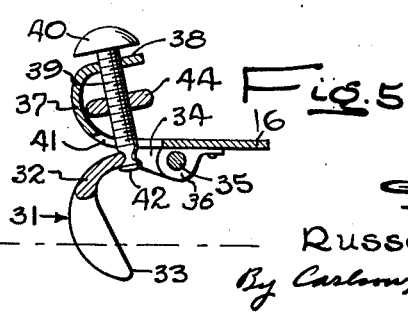

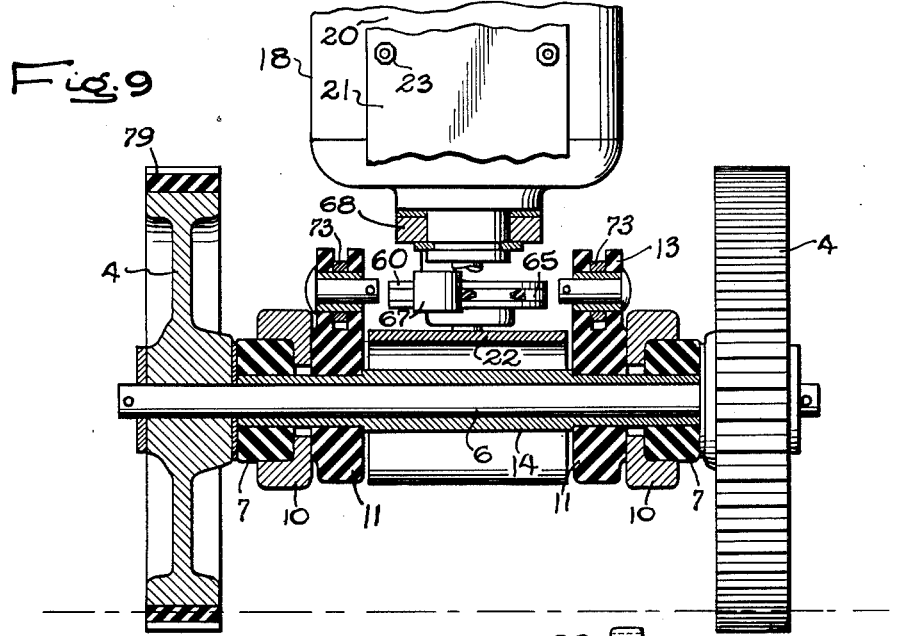

Oct. 14, 1952  R. P. HARSHBERGER  2,613,582
GARDEN TRACTOR WITH VIBRATORY TOOL
Filed Feb. 21, 1947  4 Sheets-Sheet 4
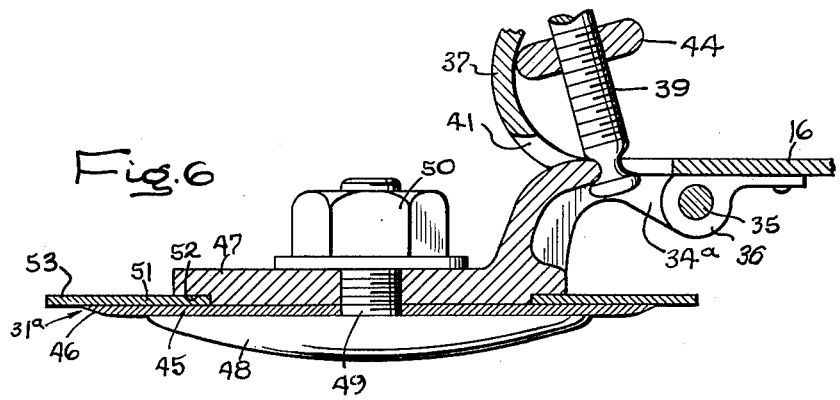
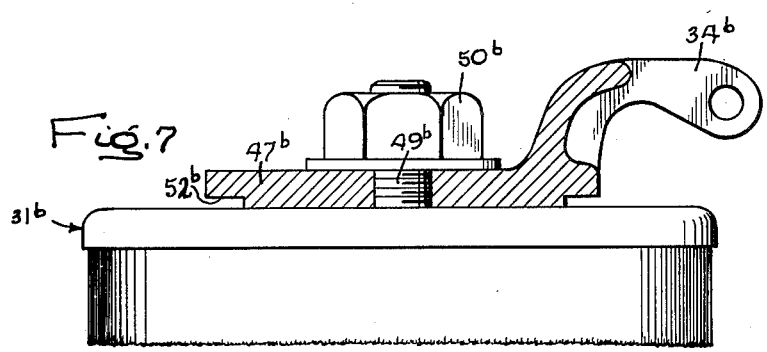
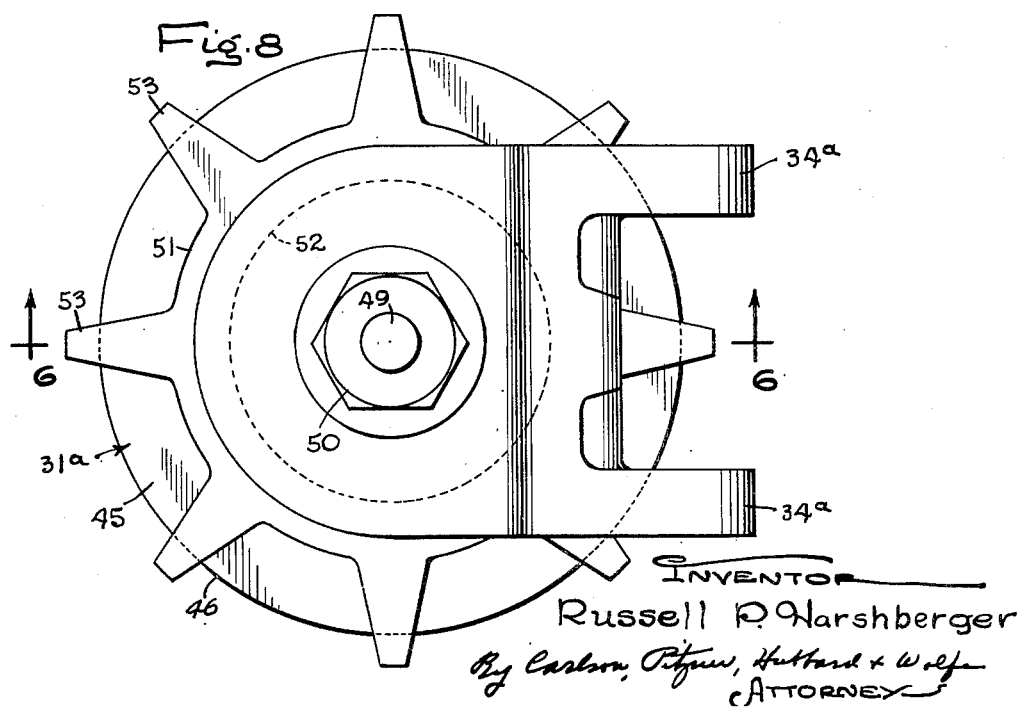
INVENTOR
Russell P. Harshberger
By Carlson, Pitzner, Hubbard & Wolfe
ATTORNEYS Patented Oct. 14, 1952

2,613,582

UNITED STATES PATENT OFFICE 2,613,582

GARDEN TRACTOR WITH VIBRATORY TOOL

Russell P. Harshberger, Altadena, Calif.

Application February 21, 1947, Serial No. 729,997

11 Claims. (Cl. 97—34)

The present invention relates generally to improvements in agitating implements adapted for various uses, such, for example, as earth working or cultivating, floor surfacing or polishing, shrub cutting, etc., and specifically to a wheeled implement of this character utilizing the action of a power-driven revoluble eccentric weight for imparting a vibrating action to the agitating tool.

One of the objects of the invention is to provide such an agitating implement in which the eccentric weight is supported on a generally vertical axis so as to create a vibratory action having a substantial transverse component in a generally horizontal plane.

Another object is to provide a translatory agitating implement adapted for earth working and the like, comprising a wheeled truck with an operator's handle, and a vibratory working unit and power plant therefor supported on the truck for translation therewith, these various elements being resiliently interconnected whereby to prevent shock induced by the vibratory action of the working unit from being transmitted in full force either to the handle or the power plant.

A further object is to provide the agitating implement with means for adjusting the pressure angle of the plane in which the eccentric weight is revoluble in relation to the surface over which the implement is operated.

Another object is to provide a double end pressure pawl reversibly engageable with each wheel of the truck to retard selectively forward or reverse movements of the implement.

Further objects and advantages will become apparent as the description proceeds.

In the accompanying drawings,

Figure 1 is a fragmentary front elevational view of an earth working machine embodying the features of the present invention.

Fig. 2 is a side elevational view of the machine.

Fig. 3 is a fragmentary plan view of the machine, partially in section along line 3—3 of Fig. 4.

Fig. 4 is a fragmentary vertical sectional view of the machine substantially along the line 4—4 of Fig. 3, and illustrating the vibratory tool in one position of adjustment.

Fig. 5 is a fragmentary sectional view illustrating the tool in another position of adjustment.

Figs. 6 and 7 are views similar to Fig. 5, but respectively illustrating two modified forms of tools.

Fig. 8 is a plan view of the tool shown in Fig. 6.

Fig. 9 is a fragmentary transverse vertical sectional view taken substantially along line 9—9 of Fig. 3.

Fig. 10 is a fragmentary view partially in side elevation, and partially in vertical section, of an implement constituting a modified form of the invention.

Fig. 11 is a fragmentary transverse vertical sectional view taken along line 11—11 of Fig. 10.

Referring more particularly to the drawings, the agitating implement, constituting the preferred embodiment of the invention, may be utilized for a variety of purposes, such, for example, as tamping, leveling, chopping or disrupting surface materials, but is especially suitable for soil cultivation and hence shown as an earth working machine. In general, the machine comprises a portable truck 1 on which an agitator or working unit 2 is operatively supported for translatory movement and for independent vibratory motion, and on which a power plant 3 is mounted for actuating the agitator unit.

The truck 1 is mounted on wheels 4 preferably for manual propulsion by means of a rearwardly projecting handle 5. In the preferred form, the wheels 4 are rotatably confined on opposite ends of a transverse shaft or axle 6. Fitted on opposite end portions of the axle 6 inwardly of and closely adjacent the hubs of the wheels 4 are two shock absorber rings 7 of suitable resilient matter, such as rubber. The operating handle 5 may be of any conventional form, and, in the present instance, is generally U-shaped, with side legs 8 extending downwardly and forwardly from the bent upper cross member constituting the handle bar 9. At the lower ends, the legs 8 of the handle 5 are formed with annular internally flanged cups 10 which freely encircle the axle 6 inwardly of the rubber rings 7, and in the outer recessed faces of which the rings are inserted and molded to provide a yieldable pivotal attachment. It will be understood that the shock absorber rings 7 serve to prevent shock and vibration originating in the working unit 2 from being transmitted in full force to the handle 5 and the operator.

The working unit 2 and power plant 3 likewise are supported from the axle 6 between the arms 8 of the handle 5 through a yieldable suspension mounting. More particularly, two snubber yoke members 11 of suitable resilient material, such as rubber, and generally of bell crank shape, are rotatably supported on the axle 6 in axially spaced relation against the inner faces of the cups 10. Each of the members 11 has a relatvely long arm 12 extending forwardly of the axle 6, and a relatively short arm 13 extending upwardly. A spacer sleeve 14 is positioned on the axle 6 between the members 11 to maintain the various elements 7, 10 and 11 in proper location on opposite end portions of the axle. Preferably, the opposite ends of the sleeve 14 are reduced in outside diameter and extended through the elements 7, 10 and 11 to the hubs of the wheels 4.

A suspension shaft 15 is extended transversely through the forward ends of the arms 12. Supported from the shaft 15 between the arms 12 is an elongated rectangular generally horizontal base plate 16 constituting the frame of the working unit 2. In the present instance, two angle brackets 17 are riveted to the top of the plate 16 at the opposite side edges of the latter, and have upstanding apertured flanges receiving the shaft 15 and disposed against the inner sides of the arms 12. Preferably, the shaft 15 is square in cross-section so that the working unit 2 may be supported and urged toward the surface being worked through pressure on the handle 9.

The power plant 3 comprises an electric motor 18 supported in a vertical position, with its shaft 19 projecting downwardly, and provided on its rear side with a flat-faced mounting flange or pad 20. The motor support comprises a metallic spring 21 anchored to the rear end portion of the plate 16. Preferably, the spring 21 is provided in the form of a plate extending between and substantially equal in width to the space between the yoke members 11. The spring plate 21 is rigidly attached, as by riveting, at its forward end to the frame plate 16, then is bent in a loop 22 upwardly and in freely-spaced relation about the spacer 14 on the axle 6, and then is bent to extend upwardly for attachment by means of bolts 23 to the mounting flange 20 of the motor 18. It will be evident that by reason of the rubber yokes 11 and the spring suspension plate 21, shock and vibration originating in the working unit 2 will not be transmitted in full force to the motor 18.

To provide means for adjustably stabilizing the motor 18, a coiled tension spring 24 is anchored at one end by means of an eye 25 to the upper end of the spring plate 21, and at the other end to an ear 26 on a sleeve 27 provided with a handgrip 28 and slidable on a rod 29 extending between the arms 8 of the handle 5. It will be understood that the rod 29 is rigidly anchored at opposite ends to the arms 8, and is parallel to the axle 6. The sleeve 27 is selectively adjustable into different positions along the rod 29 by means of the handgrip 28 so as to vary the angle and tension of the spring 24, and thereby the stabilizing force, which is particularly desirable when the implement is used on hillside surfaces and other uneven surfaces. A spring detent (not shown) within the sleeve 27 is engageable in any one of a series of recesses 30 in one side of the rod 29 to secure the sleeve releasably in selected position of adjustment.

The frame or base plate 16 extends forwardly from the suspension rod or shaft 15 for attachment thereto of any suitable type of implement or tool depending on the nature of the operation which is to be performed. In Figs. 1 to 5, a cultivator rake 31 is shown, and, in the specific form provided, comprises an elongated transverse bar 32 with a longitudinal series of closely-spaced depending tines 33. The center of the bar 32 has a mounting yoke 34 defining spaced parallel rearwardly-extending legs closely receiving the forward end portion of the plate 16 therebetween. A pivot bolt 35 extends through the legs of the yoke 34 and depending ears 36 on opposite side edges of the plate 16 to establish an adjustable connection, and is adapted to be secured removably in position by a cotter pin 35a.

To provide means for adjusting the angle of the tines 33, the forward end portion of the plate 16 is bent or curled upwardly and reversely at 37, and is formed with a tapped opening to constitute a fixed nut 38. An adjusting screw 39, with a hand knob 40 on the upper end, is in threaded engagement with the nut 38 and extends downwardly through a slot 41 in the plate 16. The lower end of the screw 39 is formed with an enlarged head 42 spaced from the body by a peripheral groove 43 of rounded section, and engaging underneath the rear edge of the bar 32 of the rake which is thus engaged within the groove. It will be evident, that upon rotatry actuation of screw 39, the angular disposition of the rake 31 in relation to the plane of the plate 16 may be adjusted. Fixed on the shank of the screw 39 is a lock washer 44 with a rounded periphery which is disposed within the bend of the curl 37 and adapted to engage the inner surface thereof at opposite limits of adjustment. Thus, the rake 31 may be adjusted and clamped selectively into either a forwardmost position as shown in Fig. 4 in which it tends to pull up, or a rearward position of greater inclination beneath the plate 16 as shown in Fig. 5 in which it tends to dig in.

Instead of a cultivating implement 31, the tool may consist of a horizontal circular blade 31a, as illustrated in Figs. 6 and 8, adapted particularly for mowing or trimming of vegetation, such as shrubs, or a floor working element, such as a sander (not shown), polisher (not shown), or scrubbing bush 31b as illustrated in Fig. 7. Referring to Figs. 6 and 8, the blade 31a preferably comprises a circular disk 45 having a beveled knife edge 46 and removably clamped between upper and lower disks 47 and 48. The upper disk 47 is formed with a yoke 34a adapted to be mounted on the plate 16 in the same manner as the yoke 34. The lower disk 48, of somewhat larger diameter and preferably partial spherical form, has a central screw stud 49 extending through central openings in the blade 31a and disk 47 and engaged by a clamping nut 50. An annular star wheel 51 is confined for free rotation in a peripheral groove 52 in the underside of the disk 47, and has radial guard members 53 extending outwardly beyond the periphery of the knife 45, 46.

The scrubbing brush 31b (Fig. 7) extends transversely of the plate 16, and has a central screw stud 49b extending through a supporting plate 47b for engagement by a clamping nut 50b. Here again, the plate 47b has a yoke 34b adapted to be mounted on the plate 16 in the same manner as the yoke 34.

The working unit 2, which comprises any replaceable tool, such, for example, as the rake 31, the knife 31a or the scrubbing brush 31b, etc., also includes means driven from the power plant 3 for imparting a gyratory or vibratory motion thereto generally in a horizontal plane. In this connection, it will be noted that the resilient yoke members 12 are subject to limited flexure, thus permitting, and at the same time tending to snub, vibration of the frame 16 relative to the axle 6. In the preferred form of the invention, the vibration creating means comprises an eccentric revolving weight 54 driven by the power plant 3. The weight 54 consists of a semi-circular segment 55 mounted immediately over the plate 16 for rotation on a generally vertical axis between the operating tool 31 and the suspension bar 15. More particularly, the segment 54 is provided with an upstanding hub 56 having an axial bore 57 in which a bearing sleeve 58 is inserted. A headed bearing pin 59 extends from below the plate 16 through the latter and the sleeve 58, and through a concentric pulley 60 rigidly secured to the hub 56. These various elements are secured in assembled relation by a ring 61 secured to the upper end of the pin 59. Rigid with the hub 56 and extending diametrically opposite the segment 55 is a bifurcated radial arm 62 in which a thrust roller 63 is journalled for rolling engagement with the periphery of the pin 59. The segment 55 constitutes an eccentric weight which upon being revolved at high speed acts through centrifugal force to impart a sharp vibratory or gyratory movement to the frame 16 and hence to the tool 31 mainly in a plane transverse to the axis of the pin 59. In order to permit adjustment of the mass of the eccentric weight 55, tapered plugs 64 of selectively different, and usually heavier material, may be removably inserted in a complemental opening therein. By reason of the resilient character of the yoke members 12, the full force or shock of the vibratory action created by the weight 55, 64 is not transmitted to the axle 6, and, due to the rubber connectors 7, any shock that is transmitted thereto is additionally snubbed before reaching the operator's handle 5.

The drive for the eccentric weight 55, 64 from the power plant 3 may be of any suitable character, and, as shown, comprises a V-belt 65 running over the pulley 60 and an alined pulley 66 on the motor shaft 19. To maintain the belt 65 under tension, it is engaged by a take-up roller 67 journalled in one end of a lever 68 rotatably confined intermediate its ends on a motor bearing 69 for the shaft 19. The other end of the lever 68 is yieldably biased by a tension spring 70 anchored to the spring plate 21. Thus, the spring 70 serves not only to maintain the belt 65 tight, but also to minimize the transmission through the latter of vibration from the working unit 2 to the motor 18.

To enclose the revolving weight 55, 64, it is disposed within a circular upwardly-opening casing 71 secured to the top of the plate 16 concentrically about the pin 59. A dome-shaped cover or guard 72 open at the rear to permit entry of the belt 65 is fitted in position to close the top of the casing 71.

Since the rubber yoke members 11 are angularly movable about the axle 6, adjustable means is provided for interconnecting them with the operator's handle 5, so as to support the frame 16 and the elements mounted thereon in operative position generally horizontally in relation to the axle 6. Thus, the upwardly projecting arms 13 of the yoke members 11 are pivotally connected through links 73 to the lower ends of two hand levers 74 rotatably journalled intermediate their ends respectively on opposite end portions of the rod 29. Each lever 74 is provided with a pivotal spring-actuated pawl 75 selectively engageable in any one of the notches of a toothed index sector plate 76 rigidly secured to the adjacent arm 8. By adjusting the levers 74, the yoke members 11 and the frame 16 thereon may be angularly adjusted in relation to the handle 5, and thereby supported therefrom in any desired operative position.

The vibratory or gyratory motion imparted to the working unit 2 through the action of the revolving eccentric weight 55, 64 has a tendency, by reason of its longitudinal component of force, to cause alternate movement of the implement in forward and reverse directions. Means is provided under the control of the operator for neutralizing the tendency of the implement to move in either direction while at the same time leaving the corresponding tendency of the implement to move in the opposite direction free to cause self-propulsion of the implement. In the present instance, this means is shown as comprising two pawls 77 pivotally mounted intermediate their ends on outwardly projecting studs 78 on the side arms 8 of the handle 5 for engagement respectively with the periphery of resilient tires 79 of the wheels 4. Each pawl 77 is of the double end type, and is pivotal reversely to position one or the other of the ends selectively into gripping engagement with the associated tire 79 to resist or retard either forward or reverse movement. To this end, the pawls 77 are connected through links 80 to two sleeves 81 slidable on the arms 8 and rigidly interconnected by a cross rod 82 constituting a handgrip. By lowering the rod 82, the pawls 77 will be swung to bring their forward ends into engagement with the tires 79 so as to retard rearward movement and cause the forward movement of the implement under influence of the eccentric weight to become cumulative to propel the implement forwardly. Upon raising the rod 82, the pawls 77 will be reversed to bring their rear ends in engagement with the tires 79 so as to retard forward rotation of the wheels 4 and cause rearward self-propulsion of the implement.

Current to the motor 18 may be supplied through an electric wire cable 83.

Figs. 10 and 11 illustrate a modified form of the invention which is generally similar to that disclosed in Figs. 1 to 9, and of which like parts are identified by the same reference numerals plus the letter $a$. In this form, the handle $5a$, instead of being connected to the axle $6a$, is anchored directly to the upstanding arms $13a$ of the yoke members $11a$. Thus, the lower ends of the arms $8a$ of the handle frame are rigidly secured, as by welding, to two pressure plates 84 which are tightly inserted through slots 85 in the members $11a$.

The yoke members $11a$, instead of being rotatably supported directly on the axle $6a$ or the spacer sleeve $14a$, are apertured to embrace tightly oblong or generally elliptical cams 86 journalled on opposite end portions of the axle and having depending hand levers 87 whereby they may be adjusted in angular phase relation through 180°. The rubber of the members $11a$, though sufficiently yieldable to permit forceful displacement of the cams 86 for purposes of adjustment, is medium hard so as to maintain the parts normally in fixed relation. By reason of the adjustable cam mounting, the snubber members $11a$ may be located selectively either in lowered position in relation to the axle, as shown in Figs. 10 and 11, or in elevated position, so as to vary the angular disposition of the working unit $2a$ operatively in relation to the underlying surface.

The motor $18a$, instead of being supported from the plate 16 through the spring 21, is supported directly from the snubber members $11a$. More particularly, the motor $18a$ is disposed within and swiveled from a U-shaped yoke 88 by means of a rocker pin 89. The yoke 88 has spaced parallel depending arms 90 connected by pins 91 to the upper ends $13a$ of the members 11a. The members 11a are connected by a transverse rod 92 and spacer 93.

To stabilize the motor 18a and maintain the belt 65a under tension, the former is connected through tension springs 24a to the handle 5a.

It will be evident that I have provided an agitating implement which is translatory over the surface to be worked, and which is adapted to impart a generally horizontal vibratory action to the tool. By reason of the resilient support for the means creating the agitating motion, a minimum of shock is transmitted to the motor and the operator's handle.

I claim as my invention:

1. An agitating implement for earth working and the like comprising, in combination, a translatory wheeled carriage, a frame yieldably supported on said carriage and projecting forwardly thereof, an operating handle yieldably supported on said carriage and extending rearwardly thereof, an agitating tool mounted on the forward end of said frame and having depending working elements, a working unit mounted on said frame and including an eccentric mass revoluble about a generally vertical axis for imparting a generally lateral vibratory motion to said elements, a power plant yieldably supported on said frame and operatively connected to drive said unit, yieldable means adjustably interconnecting said power plant and said handle for stabilizing said power plant, and adjustable and yieldable linkage interconnecting said frame and said handle to determine the relative operative position of said frame.

2. An agitating implement for earth working and the like comprising, in combination, a translatory wheeled carriage having a supporting axle, a bell-crank yoke of resilient rubber material supported for pivotal movement on said axle and having forwardly-projecting arms and upwardly-projecting arms, a suspension rod anchored in said forwardly-projecting arms, a generally horizontal frame plate pivotally supported at its rear end on said rod and projecting forwardly thereof, an operating handle pivotally supported on said axle and extending rearwardly thereof, an agitating tool mounted on the forward end of said frame and having depending working elements, a working unit mounted on said frame and including an eccentric mass revoluble about a generally vertical axis for imparting a generally lateral vibratory motion to said elements, a power plant yieldably supported by a leaf spring from said frame rearwardly of said rod and operatively connected to drive said unit, and means interconnecting said upwardly-projecting arms and said handle to predetermine the angular position of said frame plate relative to said handle about said axle.

3. An agitating implement for earth working and the like comprising, in combination, a translatory twin-wheeled carriage having a supporting axle, two axially-spaced bell-crank rubber snubber members rotatably confined on said axle, and having forwardly-extending arms and upwardly-extending arms, tie means interconnecting said members, a forwardly-projecting frame supported from said forwardly-extending arms, a working unit mounted on said frame and including tool means and means for imparting a vibratory action to said tool means, a leaf spring anchored to said frame and extending rearwardly therefrom between said members over said axle and then upwardly, a motor supported from the upper end of said spring and connected through a belt to drive said last mentioned means, resilient means for maintaining said belt under tension, an operating handle pivotally supported on said axle, means adjustably interconnecting said upwardly extending arms and said handle, and stabilizing means for adjustably connecting said motor to said handle.

4. An agitating implement for earth working and the like comprising, in combination, a translatory twin-wheeled carriage having a supporting axle, two axially-spaced bell-crank rubber snubber members rotatably confined on said axle and having forwardly-extending arms and upwardly-extending arms, tie means interconnecting said members, a forwardly-projecting frame supported from said forwardly-extending arms, a working unit mounted on said frame and including tool means and means for imparting a vibratory action to said tool means, a leaf spring anchored to said frame and extending rearwardly therefrom between said members over said axle and then upwardly, a motor supported from the upper end of said spring and connected to drive said last mentioned means, and an operating handle pivotally supported on said axle, and means for interconnecting said upwardly-extending arms and said handle.

5. An agitating implement for earth working and the like, comprising, in combination, a translatory twin-wheeled carriage having a supporting axle, two axially-spaced bell-crank rubber snubber members rotatably confined on said axle and having forwardly-extending arms and upwardly-extending arms, tie means interconnecting said members, a forwardly-projecting frame supported from said forwardly-extending arms, a working unit mounted on said frame and including tool means and means for imparting a vibratory action to said tool means, an inverted U-shaped yoke member secured at its lower ends to said upwardly-extending arms, a motor supported from said yoke for driving said unit, an operating handle connected to said upwardly-extending arms, and spring means anchoring said motor to said handle.

6. An agitating implement for earth working and the like comprising, in combination, a translatory twin-wheeled carriage having a supporting axle, two eccentric sleeve elements mounted in axially-spaced relation on said axle for rotary adjustment to project either downwardly or upwardly, two bell-crank rubber snubber members having complementally shaped openings therein snugly receiving said eccentric sleeve elements and having forwardly-extending arms and upwardly-extending arms, the yieldable body of said members being deflectable to permit relative adjustment of said sleeve elements through 180°, a frame supported from said forwardly-extending arms, tool means on said frame, power operated means for imparting a vibratory motion to said tool means, and a handle on said carriage interconnected with said upwardly-extending arms.

7. An agitating implement comprising, in combination, a translatory wheeled truck having a transversely-extending axle, a forwardly-projecting frame swiveled at one end on said axle, a power-operated vibrating unit mounted on said frame and having depending tool means for engaging the surface over which the implement is operated, said unit including a movable mass for imparting vibrations to said unit, a rearwardly-extending handle for propelling said truck and swiveled at one end on said axle, a linkage interconnecting said frame and handle and being adjustable to determine the angular relation therebetween about said axle as a center, and resilient rubber snubbers in the swivel connections of said frame and handle with said axle.

8. An agitating implement for earth working and the like comprising, in combination, a translatory twin-wheeled carriage, a frame supported from said carriage and resiliently connected thereto for relative lateral and vertical vibration, a tool connected to said frame and having depending means for working the surface over which the implement is operated, power operated means including a rotary eccentric mass for imparting a vibratory motion to said frame and tool having force components directed both forwardly and rearwardly of the implement, a handle on said carriage for translating said implement, and brake means adjustably mounted on said carriage and movable into engagement with the carriage wheels selectively to retard said implement against either forward or reverse movement of said implement resulting from said force components and to bring about corresponding reverse and forward propulsion of said implement under influence of said mass.

9. An agitating implement for earth working and the like comprising, in combination, a translatory twin-wheeled carriage having a supporting axle, two eccentric sleeve elements mounted in axially-spaced relation on said axle for rotary adjustment to project either downwardly or upwardly, two bell-crank rubber snubber members having complementally shaped openings therein snugly receiving said eccentric sleeve elements and having forwardly-extending arms and upwardly-extending arms, the yieldable body of said members being deflectable to permit relative adjustment of said sleeve elements through 180°, a frame supported from said forwardly-extending arms, tool means on said frame, power operated means for imparting a vibratory motion to said tool means, and including a motor supported from said upwardly-extending arms, a handle connected to said upwardly-extending arms, and stabilizing spring means connecting said motor to said handle.

10. An agitating implement for earth working and the like comprising, in combination, a translatory wheeled carriage having an axle, eccentric sleeve means rotatably mounted on said axle, a forwardly-projecting frame having rubber anchor means snugly embracing said sleeve means, a tool connected to said frame and having depending means for working the surface over which the implement is operated, and power operated means for imparting a vibratory motion to said frame and tool, whereby adjustment of said sleeve means in said rubber anchor means serves to adjust the trailing end portion of said frame vertically with respect to said axle.

11. An agitating implement for earth working and the like comprising, in combination, a translatory twin-wheeled carriage having a supporting axle, a resilient yoke mounted on said axle and supporting a suspension rod parallel to said axle, a working unit and a power plant therefor mounted in horizontal suspension from said rod and at opposite sides thereof, said working unit comprising an agitating tool, and means including a revoluble eccentric mass mounted for imparting a vibratory motion to said tool, and means including a handle for maintaining said yoke in operative position angularly with respect to said axle.

RUSSELL P. HARSHBERGER.

REFERENCES CITED

The following references are of record in the file of this patent:

UNITED STATES PATENTS

| Number | Name | Date |
| --- | --- | --- |
| 1,948,167 | Cornwell | Feb. 20, 1934 |
| 2,032,382 | Torrison | Mar. 3, 1936 |
| 2,178,077 | Loftis | Oct. 31, 1939 |
| 2,270,309 | Kehle | Jan. 20, 1942 |
| 2,373,430 | Strome et al. | Apr. 10, 1945 |
| 2,379,763 | Sweet et al. | July 3, 1945 |
| 2,396,579 | Krotz | Mar. 12, 1946 |
| 2,410,273 | Deubner | Oct. 29, 1946 |
| 2,416,401 | Meisenburg | Feb. 25, 1947 |
| 2,425,655 | Tompkins | Aug. 12, 1947 |